United States Patent

[11] 3,566,159

[72] Inventor Bradley J. Plunkett
Van Nuys, Calif.

[21] Appl. No. 739,054
[22] Filed June 21, 1968
[45] Patented Feb. 23, 1971
[73] Assignee Warwick Electronics Inc.
Chicago, Ill.

[54] FREQUENCY MULTIPLIER CIRCUIT
7 Claims, 3 Drawing Figs.

[52] U.S. Cl. ........................................................ 307/271,
307/261, 328/20, 328/22, 328/26, 328/32
[51] Int. Cl. ........................................................ H03b 19/14
[50] Field of Search ............................................ 307/271,
261; 328/20, 26, 28, 29, 32, 38, 22; 330/96, 108

[56] References Cited

UNITED STATES PATENTS

| | | | |
|---|---|---|---|
| 2,399,135 | 4/1946 | Miller et al. | 328/28X |
| 2,583,345 | 1/1952 | Schade | 330/96X |
| 2,752,491 | 6/1956 | Ringoen | 328/28X |
| 3,021,488 | 2/1962 | Edson | 328/28X |
| 3,140,348 | 7/1964 | Laughter | 330/108X |
| 3,205,448 | 9/1965 | Bahrs et al. | 307/261X |
| 3,317,851 | 5/1967 | Julie | 330/108UX |
| 3,413,561 | 11/1968 | Hogan | 330/96X |
| 3,465,254 | 9/1969 | Murphy et al. | 330/96X |

OTHER REFERENCES

I. B. M. Technical Disclosure Bulletin Vol. 9, No. 5, Oct. 1966, pp. 536, 537, tilted Double Frequency Pulse Amplifier, by R. E. Hanson. A copy is located in 307/261 in Art Unit 254.

*Primary Examiner*—Stanley T. Krawczewicz
*Attorney*—Jessup & Beecher

ABSTRACT: A frequency multiplying circuit is provided which responds to input signals of a wide variety of frequencies and wave forms, to produce corresponding frequency multiplied outputs which are free of the fundamental subtone. The frequency multiplying circuit to be described includes a squaring amplifier which converts the individual inputs into corresponding square waves; and it also includes a phase splitter, differentiator and rectifier circuit coupled to the squaring amplifier to perform the frequency multiplying function.

INVENTOR:
Bradley J. Plunkett
Jessup and Beecher
By Warren T. Jessup
ATTORNEYS

FREQUENCY MULTIPLIER CIRCUIT

BACKGROUND OF THE INVENTION

Frequency doubler circuits in general are well known to the art. These include, for example, full wave rectifiers, square law doublers, tuned doublers, and the like. Of these various types of frequency multiplying circuits, the rectifier type doubler is presently in widespread use for wide frequency band applications. However, this latter type of circuit requires that the wave form of the input signal be symmetrical about the zero voltage axis. The square law doubler circuit, on the other hand, requires sinusoidal input wave forms; whereas the tuned doubler network is limited in its operation to relatively narrow ranges of input signal frequency.

The frequency multiplier circuit and system of the present invention is advantageous in that it responds to a variety of complex input wave forms, and it is operative for a wide range of input signal frequencies. In addition, the frequency multiplier circuit of the invention is most advantageous in that it produces frequency multiplied outputs which are free of the fundamental subtones, as mentioned above.

The improved frequency multiplier circuit of the invention finds particular utility in the music industry in conjunction, for example, with electronic translating units. However, it will be clear as the present description proceeds that the circuit of the present invention has general utility wherever frequency multipliers of its particular characteristics are required.

The electronic translating units referred to in the preceding paragraph are application to be used in conjunction with selected musical instruments, and to respond to the acoustical signals produced thereby to produce a variety of voices at different pitch levels. When used in such a unit, the frequency multiplying circuit of the invention responds to complex wave signals corresponding to the acoustical output of the associated musical instrument, and it serves to convert such signals into 50 percent duty cycle square waves, and subsequently into pulses having a multiplied repetition frequency as compared with the frequency of the corresponding input signal. It is usually desirable to include a filter into the translating unit, such as described in copending application (4419), Ser. No. 737,950 filed June 18, 1968, so as to transform the complex waves into approximately sinusoidal waves before they are applied to the frequency multiplier circuit of the invention.

DETAILED DESCRIPTION OF THE ILLUSTRATED EMBODIMENT

Figures 1, 2, 3:
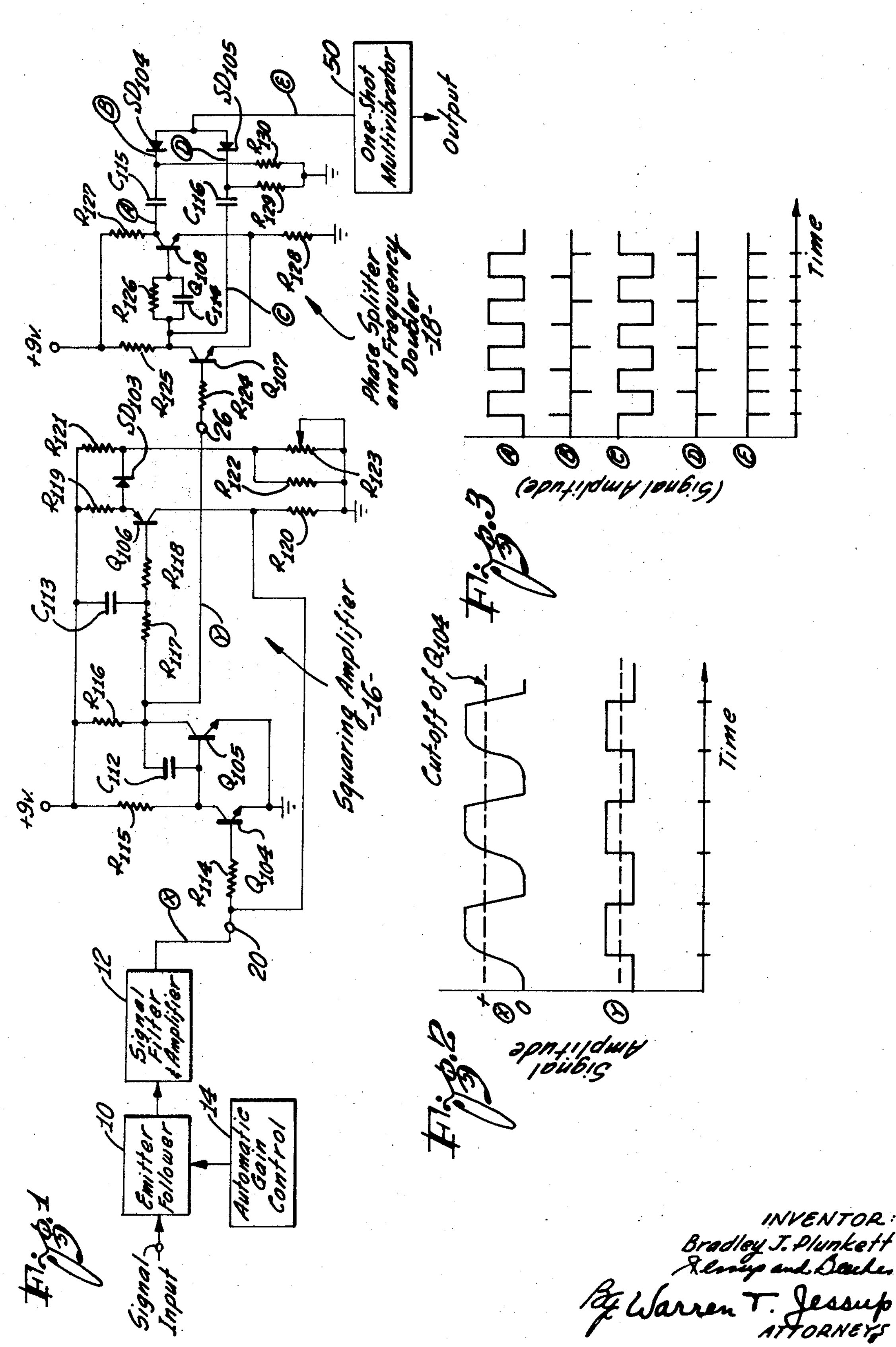
FIG. 1 is a diagram, partly in block and partly in circuit form, representative of one embodiment of the invention.
FIG. 2 is a series of curves indicating wave forms which appear in one section of the circuitry of FIG. 1.
FIG. 3 is a further series of curves indicating wave forms which appear in a second section of the circuitry of FIG. 1.

As mentioned above, although of general utility, the circuit of the present invention may be included in a translating unit for use in conjunction with a musical instrument. When so included, the acoustical signals from the musical instrument are converted into corresponding electrical signals, and these latter signals are applied, for example, to an emitter follower stage 10 in the diagram of FIG. 1. The output from the emitter follower 10 is passed through a signal filter and amplifier stage 12. The latter stage may be constructed in the manner described in detail in the aforementioned copending application (4419). An automatic gain control stage 14 may also be provided to establish the amplitude of the signals applied to the filter and amplifier 12 within a certain compressed range.

As mentioned above, the signal filter and amplifier 12 serves to convert the complex waves derived from the acoustical output of the musical instrument, into waves approximating a sinusoidal form, such a wave being indicated by the curve X in FIG. 2, for example, as appearing at the output of the signal filter and amplifier 12. The wave form of the wave produced by the unit 12 (curve X) must be such that there is a slope on the rise or the fall of the curve (or on both), as distinguished from an instantaneous rise or fall, i.e. vertical sides. With such a wave form, an appropriate duty cycle control may be effectuated, as will be described.

The frequency multiplier circuit of the invention includes, for example, a two-stage direct-coupled, high gain, direct current feedback, squaring amplifier 16; and a phase splitter and frequency doubler 18. These circuits respond to the signal of curve X, which is applied to the input terminal 20 of the squaring amplifier, and they serve to convert that signal into a series of pulses having a repetition frequency which is twice the frequency of the signal of curve X of FIG. 2, and which are represented by the curve E of FIG. 3.

The squaring amplifier 16, as shown, includes a pair of NPN transistors Q104 and Q105 the emitters of which are grounded. The input terminal 20 is connected to the base of the transistor Q104 through a 100 kilohm limiting resistor R114. The collector of the transistor Q104 is connected to the base of the transistor Q105, and is also connected to the positive terminal of a 9 volt source through a 100 kilohm resistor R115. The negative terminal of the 9 volt source is grounded.

A capacitor C112 having a value, for example, of 47 picofarads, is connected across the base and collector of the transistor Q105. The collector of the transistor Q105 is also connected to the junction of a pair of resistors R116 and R117. The resistor R116 may have a resistance of 12 kilohms, and it is connected to the positive terminal of the 9 volt source. The resistor R117 may, for example, have a resistance of 22 kilohms, and it is connected to the junction of a further resistor R118 and a capacitor C113. The capacitor C113 may have a capacity of 1 microfarad, and it is connected to the positive terminal of the 9 volt source. The resistor R118 may have a resistance of 47 kilohms, and it is connected to the base of a PNP transistor Q106.

The collector of the transistor Q106 is connected to a grounded resistor R120 which may, for example, have a resistance of 470 kilohms. The ungrounded side of the resistor R120 is connected back to the input terminal 20 to control the bias of the transistor Q104. The resistors R117 and R118, together with the capacitor C113 form a resistance-capacitance filter. The transistor Q106 forms a direct current error signal amplifier. The emitter of the transistor Q106 is connected to a resistor R119 which may, for example, have a resistance of 100 kilohms, and the resistor is connected to the positive terminal of the 9 volt source.

The emitter of the transistor Q106 is also connected to a diode SD103 for temperature compensation purposes. The cathode of the diode SD103 is connected to the junction of a resistor R121 and a resistor R122. The resistor R121 has a resistance of 18 kilohms, and it is connected to the positive terminal of the 9 volt source. The resistor R122 has a resistance of 10 kilohms, and it is grounded. The resistor R122 is shunted by a potentiometer R123, the potentiometer having a resistance, for example, of 100 kilohms. The collector of the transistor Q105 is connected to an output terminal 26.

The purpose of the squaring amplifier 16, as indicated above, is to respond to an input of substantially sinusoidal wave form, such as the signal shown in the curve X of FIG. 2, and to transform that signal into a square wave such as shown in the curve Y. For this purpose, the transistors Q104 and Q105 form a high gain direct coupled amplifier. The output terminal 26 of the amplifier is connected to the collector of the transistor Q105, as mentioned above, and the input terminal 20 of the amplifier is connected through the resistor R114 to the base of the transistor Q104. Normally, when the direct coupled amplifier formed by the transistors Q104 and Q105 is overdriven a square waveform is produced at the output terminal 26 connected to the collector of the transistor Q105, as shown by the curve Y in FIG. 2.

The dotted line across the curve X in FIG. 2 represents the level at which the transistor Q104 becomes conductive for increasing inputs and nonconductive for decreasing inputs. This level is established by the bias on the base of the transistor Q104. Due to the fact that the input wave of the curve X has curved or sloping sides, the bias on the base of the transistor Q104 may be adjusted so that a 50 percent duty cycle square wave, that is, a rectangular wave having positive and negative half-cycles, of equal duration and amplitude, is produced at the output of the amplifier for a wide variety of input wave shapes. However, in order to maintain a 50 percent duty cycle, the bias current must be controlled, since it must be adjusted for each different input signal waveform in order to produce the 50 percent duty cycle square wave at the output terminal 26.

This bias control is achieved automatically by the circuit of the transistor Q106. The resistance capacity filter R117, C113 and R118 connected to the collector of the transistor Q105 functions as an integrator. Under no signal conditions, the output of this resistance capacity filter is equal to the static voltage at the collector of the transistor Q105. When a rectangular waveform is produced at the collector of the transistor Q105, then the direct current output from the resistance capacity filter is then a function of the average value of the rectangular waveform under such dynamic conditions.

The transistor Q106 is connected as a direct current error amplifier, and its output voltage is a function of the difference between the output of the aforesaid resistance-capacity filter, and a reference voltage established by the adjustment of the potentiometer R123. The error amplifier Q106 may be adjusted by setting the potentiometer R123 to establish bias current in the transistor Q104 which is automatically controlled to force a desired duty cycle in the rectangular wave at the collector of the transistor Q105. That is, the potentiometer 123 may be adjusted so that the error signal produced across the resistor R120 controls the bias of the transistor Q104 so as to retain the desired 50 percent duty cycle square wave signal of the curve Y of FIG. 2 at the output of the amplifier, for a variety of signal waveforms applied to the amplifier from the unit 12. In other words, the setting of the potentiometer R123 establishes the firing point level of the transistor Q104, as represented by the dotted line across the curve X. This firing level, with respect to the input wave form of curve X, can establish a desired duty cycle of the wave of curve Y, which for the purposes of the system of FIG. 1 is a 50 percent duty cycle square wave. However, other rectangular waves of different duty cycles may be obtained by changing the setting of the potentiometer R123.

Whenever the signal (curve X) applied to the input terminal 20 of sufficient amplitude and of such a wave form that a rectangular wave signal (curve Y) is produced at the collector of the transistor Q105, the aforesaid control circuit associated with the transistor Q106 responds to the rectangular wave signal to produce a direct current feedback which is used to control the bias of the transistor Q104. The control is such that the output signal becomes a 50 percent duty cycle square wave such as shown in the curve Y of FIG. 2. Any tendency for the output signal to depart from such a waveform causes an error signal to be produced across the resistor R120 which, in turn, controls the bias of the transistor Q104, so as to restore the desired 50 percent duty cycle square wave waveform of the output signal. The source impedance formed by the output of the filter 12 must be sufficiently high so that it does not constitute and appreciable load on the aforesaid direct current feedback.

It is important that the signals produced at the output terminal 26 of the squaring amplifier 16 be a square wave with positive and negative half-cycles of exactly the same duration in order that the phase splitter and frequency doubler circuit 18 may produce a series of pulses of a fixed repetition frequency, corresponding to twice the frequency of the square wave. The phase splitter and frequency doubler circuit 18 includes a pair of NPN transistors Q107 and Q108 which are connected as a phase inverter. Moreover, the circuitry of the transistors Q107 and Q108 produces a slight positive feedback so as to impart toggle characteristics to the circuit so as to sharpen the edges of the square wave produced thereby.

The terminal 26 is connected to the base of the transistor Q107 through an isolating resistor R124 which may, for example, have a resistance of 100 kilohms. The emitters of the transistors Q107 and Q108 are connected to a grounded resistor R128 which may, for example, have a resistance of 470 ohms. The collector of the transistor Q107 is connected to the base of the transistor Q108 through a resistor R126 of 100 ohms, and which is shunted by a capacitor C114 of, for example, 47 picofarads.

The collector of the transistor Q107 and the collector of the transistor Q108 are connected to the positive terminal of the 9 volt source through respective 10 kilohm resistors R125 and R127. The collector of the transistor Q107 is further connected through a 47 picofarad capacitor C116 to a 120 kilohm grounded resistor 129. Likewise, the collector of the transistor Q108 is connected through a 47 picofarad capacitor C115 to a grounded 120 kilohm resistor R130. The capacitor C115 and resistor R130, and the capacitor C116 and resistor R29 form a differentiating circuit. These circuits are connected through respective diodes SD104 and SD105 to a oneshot multivibrator 50.

The square wave Y of FIG. 2 produced at the collector of the transistor Q105, as applied to the circuit 18 by the terminal 26 is translated by the circuitry of the transistor Q107 and Q108 to appear at the collectors of the respective transistors as a pair of 180° displaced square waves, shown, for example, by the curves A and C of FIG. 3. The latter square waves are shown on a different time scale in FIG. 3 as compared with the corresponding square wave Y in FIG. 2, merely as a drafting convenience. The time intervals shown at the bottom of FIG. 5 are the same as those shown at the bottom of FIG. 2, but on a slightly different scale, as noted above. The square waves shown in the curves A and C of FIG. 3 are differentiated by the differentiating circuits C115, R130 and C116, R129, to produce the pulses shown by the curves B and D respectively of FIG. 3. These latter pulses are rectified and combined by the diodes SD104 and SD105 to produce the frequency doubled pulses of the curve E.

That is, the negative pulses of each of the series shown in the curves B and D of FIG. 3 are combined by the diodes SD104 and SD105. They are interlaced in phase to produce the curve E having twice the square wave frequency. These negative pulses are applied to the input of the oneshot multivibrator 50 so as to achieve a standardized pulse width and height for the pulses at the output of the multivibrator.

It will be appreciated that the series of pulses E produced by the circuit 18 are substantially free of the fundamental subtone, in that the leading edges of the pulses are all evenly spaced. Any remaining fundamental, due for example to varying pulse shape, is virtually eliminated in the multivibrator 50. So long as the 50 percent duty cycle square wave characteristics are retained, these pulses have a constant repetition rate which is twice that of the original frequency of the square wave.

Although a particular circuit for the invention has been shown and described, it is obvious that equivalent circuits also fall within the concept thereof. The following claims are intended to cover all circuits and systems falling within the scope of the invention.

I claim:

1. A frequency multiplier circuit responsive to input signals having a generally sinusoidal wave form, said frequency multiplier circuit including:

first circuit means responsive to the aforesaid input signals for producing in response thereto corresponding square wave signals;

bias control means coupled to said first circuit means and responsive to the duty cycle of said square wave signals to control said first circuit means so as to maintain a predetermined duty cycle in said square wave signals; and further circuit means coupled to said first circuit means and responsive to the square wave signals produced thereby for developing pulses having a repetition frequency which is a selected multiple of the frequency of said square wave signals.

2. The frequency multiplier circuit defined in claim 1 in which said first circuit means includes a direct current feedback circuit constituting said bias control means.

3. The frequency multiplier circuit defined in claim 2 in which said feedback circuit includes an adjustable reference potential source.

4. The frequency multiplier circuit defined in claim 1 in which said further circuit includes a phase splitter circuit responsive to each said square wave signal from said first circuit means for producing two corresponding 180° out-of-phase square wave signals.

5. The frequency multiplier circuit defined in claim 4 in which said further circuit includes differentiating circuit means coupled to said phase-splitter circuit and responsive to said out-of-phase signals for producing corresponding series of positive and negative pulse signals; and rectifier means coupled to said differentiating circuit means and responsive to said series of pulses for producing a further series of pulses of a repetition frequency which is twice the frequency of the individual square wave signals.

6. An amplifier responsive to applied input signals having a generally sloping wave form for producing rectangular wave signals of any selected duty cycle, said amplifier including:

bias control means coupled to the input of said amplifier; and feedback circuit means coupled to the output of said amplifier and to said bias control means for maintaining a predetermined duty cycle of said rectangular wave signals, by establishing the bias of said amplifier.

7. The amplifier defined in claim 6 in which said feedback circuit includes an adjustable reference potential source for establishing the said predetermined duty cycle of said rectangular wave signals.